United States Patent [19]

Bievert et al.

[11] Patent Number: 4,871,155

[45] Date of Patent: Oct. 3, 1989

[54] MATERIAL RESTING SURFACE

[75] Inventors: Klaus Biervert, Spenge; Wolfgang Bruder; Manfred Geilhaupt, both of Bielefeld; Gerd Küpper, Bad Salzuflen; Siegfried Zabinski, Bielefeld, all of Fed. Rep. of Germany

[73] Assignee: Durkopp Systemtechnik GmbH, Fed. Rep. of Germany

[21] Appl. No.: 76,123

[22] Filed: Jul. 21, 1987

[30] Foreign Application Priority Data

Jul. 30, 1986 [DE] Fed. Rep. of Germany ....... 3625799

[51] Int. Cl.[4] .............................................. B23Q 3/00

[52] U.S. Cl. .............................................. 269/289 R

[58] Field of Search ..................... 198/688.1, 494, 495, 198/500; 425/102, 103; 118/70; 15/256.53; 184/16; 269/302.1, 289 R; 83/177

[56] References Cited

U.S. PATENT DOCUMENTS

| | | | |
|---|---|---|---|
| 3,661,245 | 5/1972 | Mol et al. | 198/688.1 |
| 3,734,486 | 5/1973 | Peacey | 269/302.1 |
| 4,354,810 | 10/1982 | Stidham | 425/101 |
| 4,408,688 | 10/1983 | Bieri | 198/500 |
| 4,674,622 | 6/1987 | Utsunomiya et al. | 198/500 |

FOREIGN PATENT DOCUMENTS

| | | |
|---|---|---|
| 0132835 | 2/1985 | European Pat. Off. . |
| 2720547 | 11/1977 | Fed. Rep. of Germany . |
| 2405117 | 5/1979 | France . |
| 2034228 | 6/1980 | United Kingdom . |

*Primary Examiner*—Robert C. Watson

*Attorney, Agent, or Firm*—Ostrolenk, Faber, Gerb & Soffen

[57] ABSTRACT

A material resting surface for a workpiece support, for use with non-mechanical cutting tools of the type which pass a cutting jet, or the like, through the workpiece and into the support. The workpiece support is coated with a kneadable composition, i.e. a substance or mixture of substances of a highly viscous or pasty consistency, and after each cutting process, a reproducible defect-free surface is restored by kneading the composition.

5 Claims, 1 Drawing Sheet

MATERIAL RESTING SURFACE

BACKGROUND OF THE INVENTION

The present invention relates to a material resting surface for a workpiece support, for use in cutting workpiece materials with non-mechanical cutting tools of the type which pass a cutting jet or the like through the workpiece and into the surface.

Such a material resting surface is to be used, for instance, in a water-jet cutting system and, as a result thereof, certain demands are made upon it. The basic requirement is that it be penetrable by the jet of water, which is under high pressure, without water collecting on its surface and then coming into contact with the material to be cut. Also, for reasons of economy, the resting surface should be usable to carry out several cutting processes without being destroyed.

Federal Republic of Germany OS No. 28 13 498 discloses a material resting surface which consists of a box profile assembled in honeycomb fashion, in which the vertices of the individual honeycombs serve as resting surfaces for the material to be cut. In this case, splashback effects on the grid are not prevented, so that the material resting on the surface is wetted when it is cut. Also, flexurally limp materials are pressed into the openings in the surface when they are cut, so that a very unclean cut results.

Federal Republic of Germany OS No. 28 13 499 discloses a bed for a fluid-jet cutting device which can consist of a plurality of rigid pins, or can be formed of resilient bristles which are sufficiently strong to support the material to be cut and at the same time sufficiently flexible to move away under a jet, of liquid. In order to be able also to cut flexurally limp material, these bristles must be very close to each other, and it follows from the domino effect that the bristles are moved away from the fluid-jet not singly but rather in large groups thereof, so that here also an unclean cutting edge is produced. Furthermore, in order to be able to ut cloth or similar material, a stretchable sheet of waterproof material must be placed over the cutting resting surface and that sheet is destroyed in the cutting operation.

U.S. Pat. No. 3,927,591 discloses a three-layer material resting surface in which a self-curing layer is arranged between an upper cover layer and a lower cover layer. This solution has the disadvantage that the upper cover layer becomes damaged and fringed after a short time and clean cuts are then no longer possible.

SUMMARY OF THE INVENTION

In view of these disadvantages of prior art references, a central object of the present invention is to create a material resting surface of the above-mentioned type, with which even flexurally limp materials can be cut easily and cleanly, and which, when used in a water-jet cutting system, prevents undesired wetting of the material to be cut and has a long life.

According to the invention, the material resting surface of a workpiece support, where the workpiece is operated upon by a cutting jet, comprises a substrate and atop the substrate is applied a layer of nonmetallic, kneadable composition, i.e., a substance or mixture of substances of a highly viscous or pasty consistency, for instance plastic. The layer covers and is adhered to the substrate. The top part of the applied layer provides the material resting surface. The cutting jet passes through the material supported on the resting surface and also cuts the layer. Beneath the layer, the substrate is designed so as not to be damaged by the cutting jet. For this purpose, therefore, the substrate may be comprised of wires or other thin elements. A preferred strong construction for the substrate is a grid or even a honeycomb, although no particular design of the substrate elements is required. The workpiece support may be a continuous plate, but is preferably an endless conveyor belt and kneading means are provided for renewing the covering layer during each cycle around the endless conveyor.

Such a material resting surface has the advantage that, due to the covering of a nonmetallic kneadable composition, not only are clean, dry cuts possible but the life of the surface is also increased by several times, since a new, defect-free surface can be reproducibly created after each cutting process that destroys that surface.

BRIEF DESCRIPTION OF THE DRAWINGS

Other objects, features and advantages of the invention will be seen from the following detailed description of an embodiment thereof, with reference to the drawing, in which.

DESCRIPTION OF THE PREFERRED EMBODIMENT

The workpiece support 1 comprises a substrate 2 made of a grid-like wire cloth material, or the like, and preferably a non-rusting material such as stainless steel, or a ceramic material. For best support of the below described covering, the substrate is honeycomb shaped, that is, when viewed from below, the wires of the grid define an open honeycomb. This permits the water of the cutting jet to pass through the substrate without interference.

A kneadable covering 3, such as a layer of silicone cement, is applied to the substrate. The substrate 2 is connected at its side to a drive chain 8.

Figure 1:
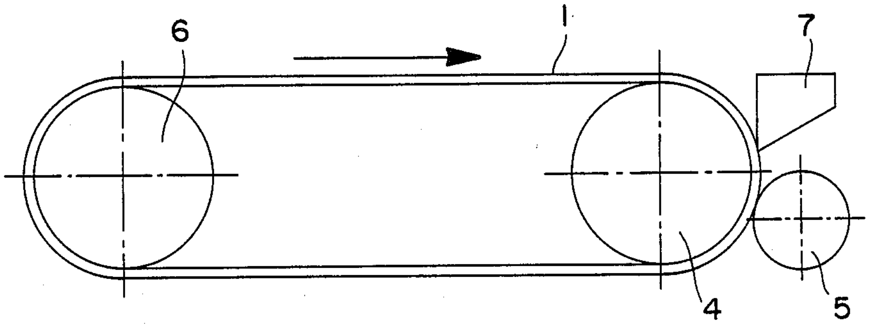
FIG. 1 is a diagrammatic side view of a workpiece support which incorporates a material resting surface according to an embodiment of the invention.
Figure 2:
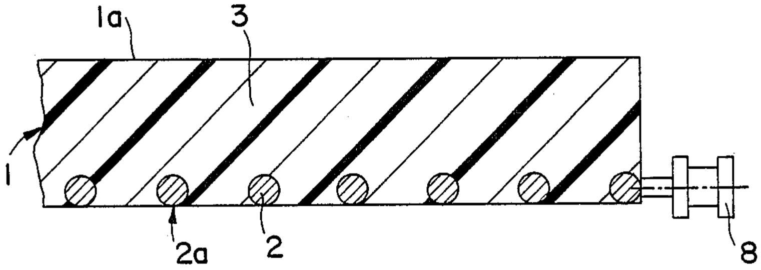
FIG. 2 is a partial sectional view through the workpiece support and material resting surface of FIG. 1.

The workpiece support 1 in this embodiment has the specific form of an endless conveyor belt which passes over a pair of rolls 4 and 6, clockwise as seen in FIG. 1. Another roll 5 is arranged adjacent to the roll 4, so that the support 1 passes between the two rolls 4 and 5. A reservoir 7 filled with silicone cement is also arranged adjacent to and slightly above the roll 4. The silicone cement is prepared so that its shape changes under the influence of gravity. It is, therefore, not rigid but is capable of flowing. It is a highly viscous, pasty material. Such a cement is sold, for instance, by Wacker-Chemie in Germany under the name "hopping cement."

The silicone cement layer 3 is applied to the substrate 2 by a rolling process. The cement thereby penetrates down to the bottom *2a* of the substrate 2 and completely surrounds the individual wires of the wire cloth that constitutes the substrate. In order to prevent vertical shifting or swinging of the workpiece support 1 during the jet cutting process, it is advisable to apply the silicone cement to the substrate 2 from both of the top and bottom sides *1a* and *2a*. This results in greater stability. The rolling-on of the cement not only results in the best possible attachment of the cement to the substrate 2, but at the same time creates a defect-free top surface 1*a*.

The material to be cut is placed on the top surface 1*a*. Slipping is usually impossible due to the high coefficient of friction of the cement layer 3. The material is cut by known water-jet cutting devices (not shown) directed down toward the top surface 1*a*. In so cutting the workpiece, the jet of water passes completely through the workpiece support 1 and also cuts the cement layer 3 apart, but the substrate is unharmed.

After the conclusion of this cutting process, the workpiece support 1 is driven far enough by the drive chain 8 that the damaged layer of cement is pulled through the rolls 4 and 5 and is plastically deformed there. Fresh silicone cement is also applied from the reservoir 7 onto the workpiece support 1 and is rolled into the damaged cement layer 3 by the rolls 4 and 5 so that material which has been washed out by the water-jet is replaced. At the same time, the cutting surface is so kneaded during the rolling process that a reproducible, renewed defect-free surface is obtained.

It is also possible to have the material resting surface 1 travel continuously and to remove the cut workpiece material from the workpiece support 1 by a device in front of the rolls 4 and 5.

It is also possible for the workpiece support to be flat, for example rectangular, in which case rolls corresponding to the rolls 4 and 5 are guided above and below the flat plate so as to effect a kneading and renewal of the surface.

Although an embodiment of the invention has been disclosed in detail herein, it is intended that the same be considered illustrative rather than limiting, and that the scope of the invention be limited only by the claims.

What is claimed is:

1. A workpiece support for use with a cutting jet, comprising in combination:

a substrate; and a material resting surface which comprises a substantially flat layer of nonmetallic kneadable composition on said substrate, said composition layer being penetrable by such cutting jet, and being mechanically kneadable thereafter to repair any damage caused by such cutting jet, and to restore said layer to substantial flatness.

2. A workpiece support as in claim 1, wherein said kneadable composition is a silicone compound.

3. A material resting surface as in claim 1, further comprising kneading means for kneading said layer to restore a substantially flat, defect-free said material resting surface.

4. A material resting surface as in claim 3, further comprising means for applying a fresh kneadable composition to said workpiece support before said support is kneaded by said kneading means.

5. A material resting surface as in claim 3, wherein said layer has a bottom surface opposite said top part, and said kneading means comprises a pair of opposed rotating rolls disposed adjacent said top and said bottom surfaces of said workpiece support, for kneading at least said top part to restore a defect-free said material resting surface after each damage thereto caused by a cutting process.

* * * * *